No. 789,770.

Patented May 16, 1905.

UNITED STATES PATENT OFFICE.

ALBERT A. SWANLUND, OF CHICAGO, ILLINOIS, ASSIGNOR OF ONE-HALF TO WILLIAM ZIMMERMAN, OF CHICAGO, ILLINOIS.

CONDENSED BREAD AND METHOD OF MAKING SAME.

SPECIFICATION forming part of Letters Patent No. 789,770, dated May 16, 1905.

Application filed September 8, 1904. Serial No. 223,741.

*To all whom it may concern:*

Be it known that I, ALBERT A. SWANLUND, a citizen of the United States, residing in Chicago, Cook county, Illinois, have invented new and useful Improvements in the Art or Process of Making Bread in Condensed Form, of which the following is a specification.

My invention relates more particularly to dry condensed and long-keeping breads. As heretofore produced such breads have been either simply ordinary loaf-bread in loaves well dried and then steamed and pressed between boards, where they were kept until dry, and thereby became very hard, and consequently difficult to reduce to any shape suitable for food, or else ordinary bread was crumbled and mixed with a binding material, as dextrine, or the white of eggs, and the like, and then compressed and also compressed and dried and used in that dry form as cakes and crackers. Such dry breads, cakes, or crackers are not only difficult to prepare for use, but on account of said hard and dry condition are very deleterious to health, because said condition causes gastric distress by absorbing the liquids and juices of the stomach to an exhausting extent, besides other great disadvantages due to said hard and dry condition.

The object of my invention is to produce a long-keeping bread which shall overcome said serious objection by producing a new breadstock, which shall be so nearly non-porous as to be free from all the destructible qualities common to all known kinds of breads, to thereby be substantially vermin-proof and least affected by climatic conditions, and, notwithstanding said high qualities of indestructibility, be quickly transformable into soft, moist, porous, palatable, and wholesome bread sufficiently coherent to be sliced for table use and free from all sanitary objections. Said desirable ends are attained by merely powdering said dense and dry loaf and mixing said powder with a determinable quantity of water and remolding the same under then comparatively light pressure into suitable form. The said dense loaf is best produced from special varieties of raised bread when properly baked, comminuted, and compacted into a highly-condensed body for the purpose of rendering it as nearly as may be free from both moisture and atmospheric and all other destructive agencies, but so conditioned in its structure that the same may most readily and quickly be converted from said indestructible condition, in which it is unconsumable, into a palatable, soft, porous, crustless, and agreeably moist bread, devoid of the deleterious attributes of freshly-raised bread, by the aid of the simplest and most universally-used utensils.

To produce said new bread, I take fermented bread of certain kinds which may be specially prepared for making my said new bread. Preferably I use that Swedish bread, which is known under the name of "knackebrod" and which is generally made of rye or wheat meal or any bread of like nature. Said Swedish bread is made by mixing its constituents into a comparatively thin and spongy dough, which is then rolled into thin sheets and baked into a uniformly hard, brittle, and dry condition. Any bread-stock thus treated is free from the crumb that is within the crust of ordinary bread. It is essential that there be no such crumb in my bread-stock, or if there is that it be changed by heat, so as to become in its nature like said Swedish bread—in other words, that it be brought to a condition where its nature becomes fixed in its keeping qualities and freed from the deleterious properties of the yeast-plant, so that my bread-stock may have the lasting qualities obtained by hard baking and great drying, and so conditioned that it may readily be coarsely powdered. Said powder is then placed into strong molds and subjected to great pressure, and so compacted into loaves or blocks having, preferably, a specific gravity of $1°$, or as near thereto as possible, nor much less than half of said density. The said blocks are then comminuted, most conveniently on a grater or more primitively and easily still, scraped down with a knife, whereby said blocks crumble into a powder, which is then placed into any convenient vessel and sprayed with water of about one-third the bulk of said loose powder, which is then quickly stirred into a homogeneously-moistened mass, which may then be made coherent, if desired, by gentle pressure, preferably in a suitable mold. My said remoistened bread is free from the unsanitary properties of highly-dried farinaceous food, as it is again moist, light, porous, and now agreeable to the taste and of entirely uniform consistency throughout, free from all external crust, admirably adapted for the forest, the camp of the army, the miner, the navy, sea-going vessels, and all like conditions, because such bread-stock may be kept in any climate, as it cannot on account of its great density and dryness be readily attacked by insects or mold or changed by unfavorable climatic conditions. It also occupies less than one-third the space of ordinary bread and even much less space than barreled flour, therefore possessing great advantages for all sea-going men in particular, as well as for armies and all those who are so conditioned as to make it essential to have the most nourishment stored and transported in the least bulk in bread-stock.

Experiment and experience have already proved that this bread-stock will readily keep in good condition for several years in a semitropical climate, with every indication that it will resist deterioration for a very long time.

What I claim is—

1. A cooked homogeneous, crustless, crumbless, highly-desiccated, and highly-compressed, easily-powdered, soft-bread stock of specific gravity from about one-half to any attainable greater density.

2. The art or process of producing soft-bread stock which consists in highly desiccating baked bread, then powdering and compressing, unadulterated, the said powder into a loaf of specific gravity of at least one-half to any attainable greater density.

3. The art or process of producing soft bread which consists in highly desiccating baked bread, powdering, and compressing, unadulterated, the said bread into a loaf of specific gravity of at least one-half, to any attainable greater density, repowdering, moistening, and compressing said loaf into soft bread.

4. A cooked homogeneous, crustless, crumbless, highly-desiccated soft-bread stock compressed into a dense yet easily-powdered mass.

5. The art or process of producing a soft-bread stock which consists in highly desiccating baked bread, powdering said bread, and compressing said powdered material into a solidly-cohering mass.

6. The art or process of producing soft bread which consists in highly desiccating baked bread, powdering and compressing the same into a loaf, then repowdering, moistening, and recompressing said moist powder into a coherent mass of soft bread.

ALBERT A. SWANLUND.

Witnesses:
J. F. PARKS,
B. F. HERR.